United States Patent
Matsui et al.

(10) Patent No.: US 6,308,194 B1
(45) Date of Patent: Oct. 23, 2001

(54) DISCRETE COSINE TRANSFORM CIRCUIT AND OPERATION METHOD THEREOF

(75) Inventors: Masaru Matsui, Gifu; Masato Fuma, Ichinomiya, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/239,409

(22) Filed: Jan. 28, 1999

(30) Foreign Application Priority Data

Jan. 30, 1998 (JP) .................................................. 10-019267

(51) Int. Cl.$^7$ ....................................................... G06F 17/14
(52) U.S. Cl. ............................................................. 708/402
(58) Field of Search ......................................... 708/400, 401, 708/402, 403, 404, 406

(56) References Cited

U.S. PATENT DOCUMENTS

| | | |
|---|---|---|
| 4,748,579 | 5/1988 | Zibman et al. . |
| 4,945,506 | 7/1990 | Baji et al. . |
| 5,117,381 | 5/1992 | Juri et al. . |
| 5,471,412 * | 11/1995 | Shyu ..................................... 708/402 |
| 5,477,469 | 12/1995 | Motomura . |
| 5,831,881 | 11/1998 | Friedrich . |
| 5,835,391 * | 11/1998 | Cho ....................................... 708/401 |
| 6,185,595 * | 2/2001 | Hori et al. ............................ 708/402 |
| 6,189,021 * | 2/2001 | Shyu ..................................... 708/401 |
| 6,209,015 * | 3/2001 | Jhung ................................... 708/402 |

* cited by examiner

Primary Examiner—Chuong Dinh Ngo
(74) Attorney, Agent, or Firm—Cantor Colburn LLP (57) ABSTRACT

There is disclosed a discrete cosine transform circuit for use in a voice recording/reproducing device to solve problems that RAM in which data is stored is frequently accessed and that the power consumption is large. In discrete cosine transform, an algorithm can be constituted to include four or less items of operand data in one operation equation. Correspondingly, four registers 62-1 to 62-4 are arranged on the output side of RAM 60. The discrete cosine transform includes a predetermined regularity. For example, a plurality of operation equations using the same operand data are included in the processing. By continuously processing all of the operation equations, the data read into the registers 62-1 to 62-4 can be reused without being overwritten in another processing, so that accesses to RAM 60 can be suppressed.

9 Claims, 3 Drawing Sheets

DISCRETE COSINE TRANSFORM CIRCUIT AND OPERATION METHOD THEREOF

BACKGROUND OF THE INVENTION

1. Field of the Invention

The present invention relates to a discrete cosine transform circuit which can be used in compression/extension processing of digital voice data in a digital voice recording device and a reproduction device and its operation method, and especially to the enhancement of the processing efficiency and the reduction of the power consumption.

2. Description of The Related Art

Figure 1:
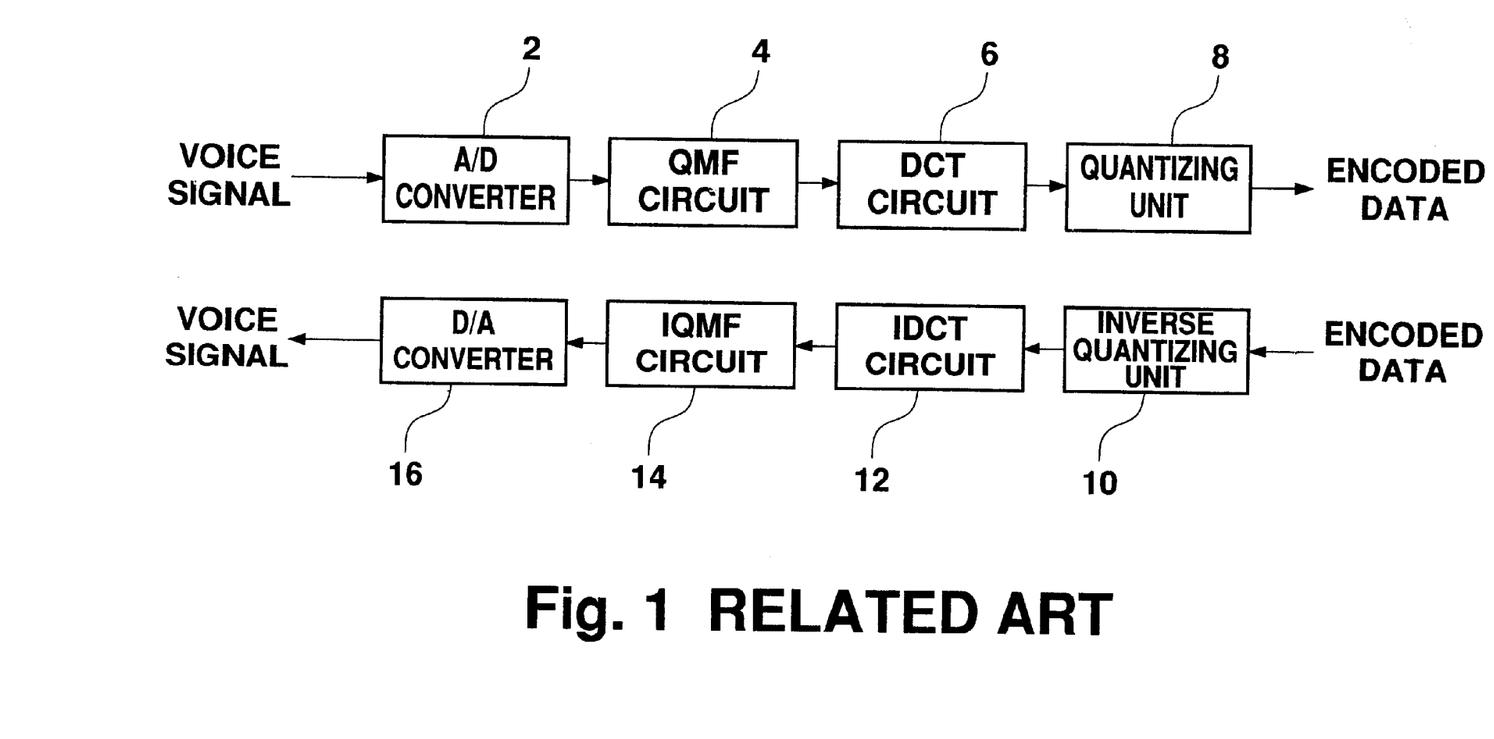
FIG. 1 is a block diagram showing a section for the encoding/decoding processing of voice data in a voice recording/reproducing device using DCT, for example, an MD system.

FIG. 1 is a block diagram showing a processing device which performs encoding/decoding of digitized voice data. At the time of recording, the entered voice signal is first converted to digital voice data by A/D (analog to digital) converter 2. The digital voice data is divided to three low, medium and high frequency bandwidths using QMF (quadrature mirror filter) circuit 4. The digital time series voice data is converted to frequency component data using DCT (discrete cosine transform) circuit 6, and further quantized by a quantizing unit 8. The generated or encoded data is supplied to the next-stage processing circuit, and recorded in a predetermined recording medium.

On the other hand, at the time of reproduction, processing reverse to the processing described above is performed. Specifically, an inverse quantizing unit 10, IDCT (inverse discrete cosine transform) circuit 12, IQMF (inverse quadrature mirror filter) circuit 14 and D/A (digital to analog) converter 16 perform the conversion reverse to the conversion performed by the quantizing unit 8, DCT circuit 6, QMF circuit 4 and A/D converter 2. Specifically, a voice signal is reproduced from the recorded encoded data.

Additionally, DCT is useful for encoding/decoding voice signals, and it has been widely used. There are various types of DCT. For example, there is one type of DCT for use in a voice recording/reproducing device which is represented by the following relational equation of 2M items of time series voice data $y(n)$ represented by a time index n which is a continuous integer and M items of frequency component data $X(k)$ represented by a wave number index k which is a continuous integer:

$$y(n) = \sum_{k=0}^{M-1} X(k)\cos\left(\frac{\pi(2k+1)(2n+M+1)}{4M}\right) \quad (0 \le n < 2M) \quad (1)$$

The DCT is slightly modified from a basic DCT and is, therefore, termed a Modified DCT, and will hereinafter be abbreviated as MDCT. Moreover, the inverse modified DCT is hereinafter abbreviated as IMDCT.

As an algorithm for processing DCT at a high rate, a method is known in which FFT (fast Fourier transform) is used. By the algorithm using FFT, sequence $y(n)$ is obtained from sequence $X(k)$ in the MDCT. Conversely, sequence $X(k)$ is obtained from sequence $y(n)$ in IMDCT.

More specifically, the relational equation (1) of the time series voice data $y(n)$ and the frequency component data $X(k)$ is represented in a format suitable for the calculation of IMDCT. For MDCT, calculation0 is performed based on equation (6) described later.

The calculation algorithm regarding IMDCT based on the equation (1) will be described hereinafter. First, the data before conversion, i.e., sequence $X(k)$ is re-arranged and re-constructed according to the predetermined rule to define a new sequence $U(k)$. Based on $U(k)$, $Z(j)$ represented in the following equation is defined. Additionally, in the equation, i denotes an imaginary number unit, and $\psi(j)$ denotes the predetermined function of j.

$$Z(j)=(U(2j)+iU(2j+1))\cdot\exp(i\psi(j)) \quad (2)$$

Furthermore, $z(n)$ defined by the following equation is obtained from $Z(j)$.

$$z(n) = \sum_{j} Z(j)\exp(i\Psi'(j)) \quad (3)$$

In order to calculate the equation (3) at high speed, FFT is used. As is well known, FFT calculates the above equation (3) by repeating the arithmetic operation represented by the following equation. Additionally, $\psi'(j)$ is the predetermined function of j.

$$Z(j_1)+z(j_2)\cdot\exp(i\psi'(j)) \quad (4)$$

In IMDCT, $u(n)$ defined in the following equation (5) is obtained from the $z(n)$, and the sequence $u(n)$ is re-arranged and re-constructed to obtain the time series voice data $y(n)$. Additionally, $a_0$ to $a_3$ are proportional coefficients defined for every n.

$$u(n)=a_0\cdot Rez(n)+a_1\cdot Rez(M/2-1-n) +a_2\cdot Imz(n)+a_3\cdot Imz(M/2-1-n)$$

$$u(M-1-n)=a_2\cdot Rez(n)-a_3\cdot Rez(M/2-1-n) -a_0\cdot Imz(n)+a_1\cdot Imz(M/2-1-n) \quad (5)$$

On the other hand, for MDCT, the following relational equation is used to obtain the frequency component data $X(K)$ from the sequence $x(n)$ based on the time series voice data $y(n)$.

$$X(k) = \frac{2}{M}\sum_{k=0}^{M-1} x_1(n)\cos\left(\frac{\pi(2k+1)(2n+M+1)}{4M}\right) \quad (6)$$

The equations (1) and (6) have substantially the same format except the coefficient 2/M. Therefore, the calculation algorithm of MDCT is expected to be similar to that of the IMDCT described above. In practice, the calculation algorithm of MDCT based on the equation (6) is as follows, and has points common with the IMDCT algorithm.

First, a new sequence $x'(n)$ is defined by the sum (or difference) of the predetermined elements of the data before conversion, i.e., the sequence $x(n)$ as shown in the following equation:

$$x'(n)=x(n_1)+x(n_2) \text{ or } x(n_1)-x(n_2) \quad (7)$$

Based on the $x'(n)$, $z(j)$ is defined in the following equation having the same format as that of the equation (2):

$$z(j)=(x'(2j)+ix'(2j+1))\cdot\exp(i\psi(j)) \quad (8)$$

Furthermore, Z(k) is obtained from the z(j) as defined in the following equation:

$$Z(k) = \sum_j Z(j) \exp(i\Psi'(j)) \qquad (9)$$

The equation (9) has the same format as that of the equation (3), FFT is also used in the high speed calculation in the same manner as in the equation (3), and the arithmetic operation is performed in the following format:

$$z(j_1) + z(j_2) \cdot \exp(i\psi'(j)) \qquad (10)$$

In MDCT, the frequency component data X(k) is obtained from the Z(k) by the following equation (11):

$$X(k) = b_0 \cdot \text{Re}Z(k) + b_1 \cdot \text{Re}Z(M/2-1-k)$$

$$+ b_2 \cdot \text{Im}Z(k) + b_3 \cdot \text{Im}Z(M/2-1-k)$$

$$X(M-1-k) = b_2 \cdot \text{Re}Z(k) - b_3 \cdot \text{Re}Z(M/2-1-k)$$

$$- b_0 \cdot \text{Im}Z(k) + b_1 \cdot \text{Im}Z(M/2-1-k) \qquad (11)$$

In the equation, $b_0$ to $b_3$ are proportional coefficients determined for each k. When the proportional coefficient $a_L$ (L=0 to 3) determined for each n is represented as $a_L = a_L(n)$ or the proportional coefficient $b_L$ (L=0 to 3) is represented as $b_L = b_L(k)$, the following relationship is established between the coefficients:

$$b_L(j) = a_L(j) \times 2/M \qquad (12)$$

Figure 2:
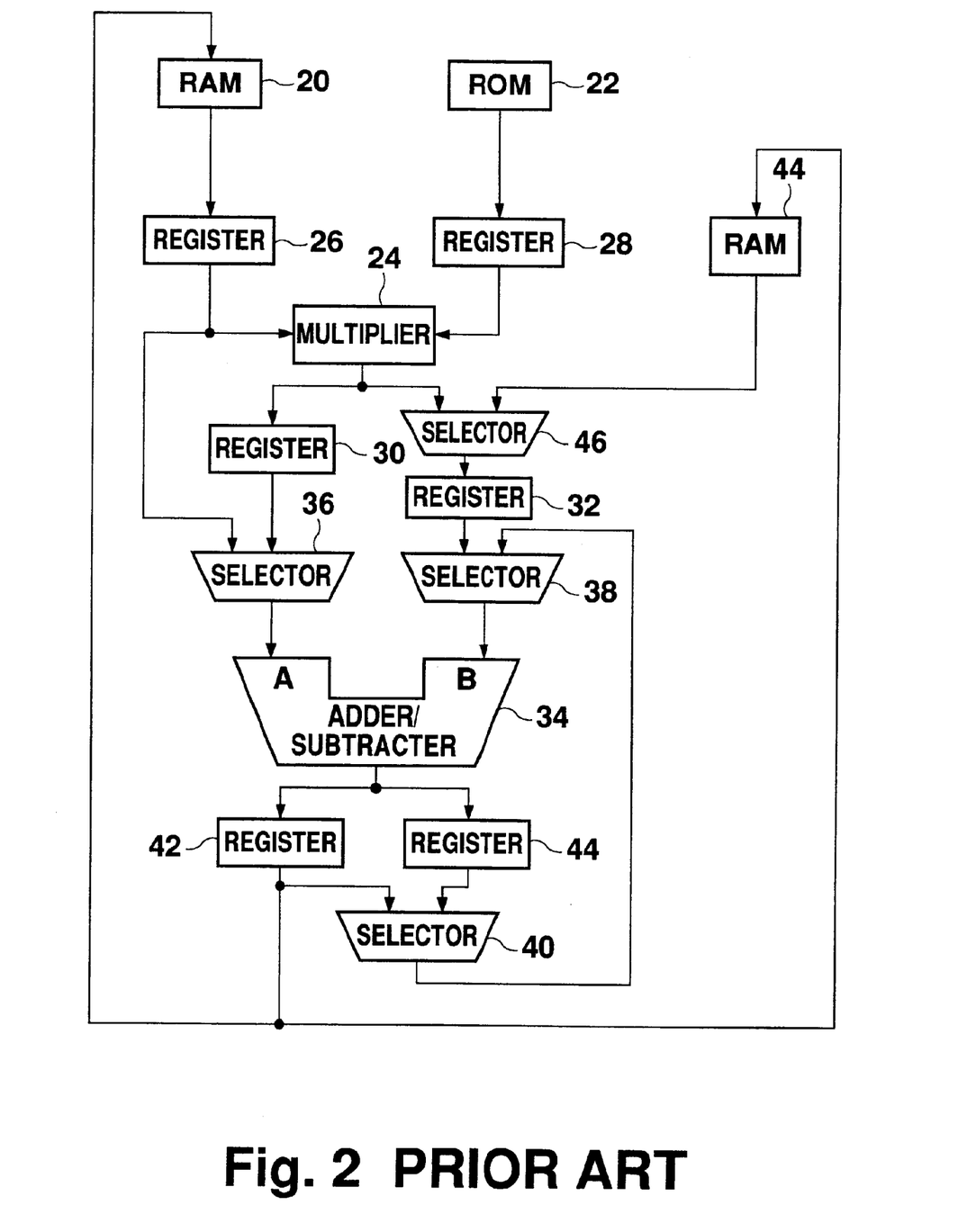
FIG. 2 is a block diagram showing a conventional IMDCT circuit.

FIG. 2 is a block diagram showing a conventional IMDCT circuit in which the aforementioned IMDCT arithmetic operation is realized. The data before conversion, i.e., the frequency component data X(k), is stored in RAM (random access memory) 20. The RAM 20 is also constituted to store the results during the course of the arithmetic operation. For example, the proportional coefficient $a_L$ (L=0 to 3) is stored in ROM (read only memory) 22. The value read from RAM 20 and held in a register 26 and the value read from ROM 22 and held in a register 28 are transmitted to a multiplier 24, which multiplies these values to transmit them to either register 30 or 32.

An adder/subtracter 34 has two inputs A, B, which are connected to selectors 36, 38. The registers 26 and 30 are connected to the input side of the selector 36. Therefore, the selector 36 can selectively supply the data stored in RAM 20 or the data multiplied by the multiplier 24 to one input terminal A of the adder/subtracter 34. On the other hand, registers 42, 44 are connected to the selector 38 via a selector 40, while the register 32 is connected to the input side of the selector 38. Therefore, the selector 38 can selectively supply the value stored in the register 32 (e.g., the value obtained by multiplying the data stored in RAM 20 by the multiplier 24) or the output result of the adder/subtracter 34 to the other input terminal B of the adder/subtracter 34. The output of the adder/subtracter 34 can be returned and written to RAM 20 via the register 42.

In the conversion of the time series voice data y(n) and the frequency component data X(k), for the time series voice data y(n), consecutive 2M items of data are regarded as one block, and the data is handled block by block. One generated block of time series voice data is stored in RAM 44. In order to minimize the distortion of voice at boundaries of the blocks, the range of the block is determined in such a manner that the end of the preceding block and the top of the following block are overlapped with each other. In the overlapped area, the data values of these blocks are added to generate the final voice data y(n). To overlap the data, the voice data stored in RAM 44 can be returned to the adder/subtracter 34. Specifically, the value read from RAM 44 is transmitted to a selector 46 placed between the multiplier 24 and the register 32. The selector 46 selects the output of the multiplier 24 or the output of RAM 44 to transmit the selected value to the adder/subtracter 34 via the selector 38.

The aforementioned arithmetic operation in the conventional circuit will next be described. First, by developing the right side of the equation (2), Z(j) is represented in the following equation:

$$Z(j) = (U(2j) \cdot \cos \psi(j) - U(2j+1) \cdot \sin \psi(j))$$

$$+ i(U(2j+1) \cdot \cos \psi(j) - U(2j) \cdot \sin \psi(j)) \qquad (13)$$

Therefore, when the data U(k) is stored in RAM 20, and $\sin \psi(j)$, $\cos \psi(j)$ are stored in ROM 22, the real-number and imaginary-number portions of Z(j) are calculated by successively using the multiplier 24 and the adder/subtracter 34. The operation results of the real-number and imaginary-number portions outputted from the adder/subtracter 34 are stored in RAM 20.

As described above, z(n) is obtained by repeating the arithmetic operation shown in the equation (4). When Z(j) stored in RAM 20 is transmitted to the adder/subtracter 34 via the register 26 and the selector 36 without passing through the multiplier 24, the first term on the right side of the equation (4) is supplied to one terminal A of the adder/subtracter 34. Moreover, the second term on the right side is generated by reading Z(j) stored in RAM 20 and $\exp(i\psi'(j))$ stored in ROM 22 and multiplying them in the multiplier 24. The multiplied value is supplied to the other terminal B of the adder/subtracter 34 via the selector 46, the register 32 and the selector 38. The adder/subtracter 34 adds the first and second terms of the equation (4), and the result is stored in RAM 20. The calculation of z(n) is also a complex arithmetic operation, and the real-number portion and the imaginary-number portion are separately calculated in the circuit.

By the arithmetic operation described above, Rez(n), Rez(M/2−1−n), Imz(n), Imz(M/2−1−n) for use in the arithmetic operation of the equation (5) are stored in RAM 20. Moreover, the proportional coefficient $a_L$ (L=0 to 3) is stored in ROM 22. The calculation of the equation (5) is performed by sequentially calculating the terms from the first term on the right side by the multiplier 24 and cumulatively adding/subtracting the values by the adder/subtracter 34.

The calculation will be described in more detail. For example, Rez(n) is read from RAM 20 and stored in the register 26. On the other hand, ao is read from ROM 22 and stored in the register 28. These values are multiplied in the multiplier 24 and stored in the register 32. Subsequently, Rez(M/2−1−n) is read from RAM 20 and stored in the register 26, while $a_1$ is read from ROM 22 and stored in the register 28. It is herein noted that the content of the register 26 is overwritten and changed from Rez(n) stored for the calculation of the first term to Rez(M/2−1−n) for use in the calculation of the second term. The Rez(M/2−1−n) and $a_1$ are multiplied in the multiplier 24 and stored in the register 30. The adder/subtracter 34 calculates "A+B" in accordance with the contents of the registers 32 and 30 and transmits the result to the register 44.

Subsequently, the third term is calculated in the same manner as the first and second terms, and stored in the register 30. The adder/subtracter 34 calculates "A+B" in accordance with the content of the register 30 and the cumulative added value up to the second term supplied from the register 44, and transmits an output to the register 44. The fourth term is calculated in the same manner, and added to the added value up to the third term, then the result is returned to RAM 20. Thereafter, the second equation of the equation (5) is calculated in the same manner as the first equation. In the calculation of the second equation, the second term transmitted to the input terminal A corresponds to the subtraction from the first term supplied to the input terminal B, and the adder/subtracter 34 performs "B−A".

The structure and operation of the conventional IMDCT circuit have been described above. As described above, since the IMDCT arithmetic operation and the MDCT arithmetic operation have common parts, the conventional MDCT circuit structure is substantially the same as that of the IMDCT circuit shown in FIG. 2, and its operation is substantially the same as the aforementioned operation.

As described above, MDCT and IMDCT arithmetic operation results in each stage are stored in RAM 20, and read for use in the next-stage arithmetic operation. Since the number of arithmetic operation stages is large and the number of data handled in the digital voice recording/reproducing device or the like is also large, the frequency of access to RAM 20 is increased. This also increases the power consumption for the operation of RAM 20. Therefore, a disadvantage is caused that the operation time is shortened in a device, e.g., a portable MD system using a battery as a power source.

Additionally, in some applications, there may be a demand for increase in the number of voice samples per unit time. In this case, there is a possibility that the number of samples is; limited by the fact that the increasing amount of MDCT arithmetic operation must be processed within the unit time.

SUMMARY OF THE INVENTION

The present invention has been developed to solve the problems described above, and an object thereof is to provide a discrete cosine transform circuit for performing MDCT in which processing is efficiently performed to reduce the frequency of access to RAM and suppress the power consumption, so that the total time spent in the access is shortened.

In the present invention, there is provided a discrete cosine transform circuit for performing discrete cosine transform or its inverse transform, which comprises a memory for storing operand data based on either data before conversion of the time series voice data y(n) and the frequency component data X(k), four registers being able to hold the operand data read from the memory, and a selector for selecting any one of the four registers to transmit the value held by the selected register to the multiplier.

In the MDCT or IMDCT arithmetic operation described above, there are a maximum of four operands, or four terms at maximum obtained by multiplying the operands by the proportional coefficient, which are added/subtracted to obtain one arithmetic operation result data. In addition to the data before conversion, i.e., either the time series voice data y(n) or the frequency component data X(k), the operand data include the interim results of the processing which are calculated and stored in the memory in each stage of the processing to be used in the next-stage arithmetic operation. According to the present invention, the operand data for use in the calculation of the arithmetic operation data is held in the register. If there is any data that can also be used in the calculation of another arithmetic operation data, the value of the data held in the register is referred to without reading new values from the memory.

Especially, in a case where the discrete cosine transform processing includes the arithmetic operation for obtaining the value of function G(j) from the values of two functions F1(j) and F2(j) obtained based on the time series voice data y(n) or the frequency component data X(k) (argument j being integer, and $0 \leq j < M/2$) by the following equations:

$$G(j)=a0 \cdot F1(j)+a1 \cdot F1(M/2-1-j)$$

$$+a2 \cdot F2(j)+a3 \cdot F2(M/2-1-j)$$

$$G(M-1-j)=a4 \cdot F1(j)+a5 \cdot F1(M/2-1-j)$$

$$+a6 \cdot F2(j)+a7 \cdot F2(M/2-1-j),$$

a0 to a7 being proportional coefficients, the discrete cosine transform circuit of the present invention includes memories for storing the function values of F1(j) and F2(j), four registers able to hold the values read from the memories, and a selector for selecting any one of the four registers to transmit the value held in the register to the multiplier.

According to the present invention, in a method for operating the discrete cosine transform circuit of the present invention including the processing using the above operation equations, the set of the above-mentioned functional values F1(j), F1(M/2−1−j), F2(j) and F2(M/2−1−j) are read corresponding to a certain j from the memory, and each of the read values is stored in the four registers. The stored set of the functional values is held in the registers while both the first and second operation equations are calculated corresponding to the value of j. Both the first and second equations are calculated corresponding to the value of j using the held set of the functional values.

The first and second operation equations are the same in the set of functional values F1(j), F1(M/2−1−j), F2(j), F2(M/2−1−j) for use. According to the present invention, if the functional values F1(j), F1(M/2−1−j), F2(j), F2(M/2−1−j) regarding a certain j are read, these are continuously held and prevented from being overwritten with other data during the calculation of both the functional values G(j), G(M−1−j). Therefore, for example, if the set of the functional values F1, F2 for calculating the functional value G(j) is read from the memory into the register, the functional value G(M−1−j) can be calculated without newly reading the set of functional values F1, F2 from the memory.

According to the present invention, in the method for operating the discrete cosine transform circuit of the present invention including the processing using the above operation equations, the set of the above-mentioned functional values F1(j), F1(M/2−1−j), F2(j), F2(M/2−1−j) are read corresponding to a certain j from the memory, and each of the read values is stored in the four registers. The stored set of the functional values is held in the registers while both the calculation of the values G(j), G(M−1−j), G(M/2−1−j) and G(M/2+j) in the value of j is performed. The values G(j), G(M−1−j), G(M/2−1−j) and G(M/2+j) in the value of j are calculated using the held set of the functional values.

When j is $j_1$, the functional values F1(j), F1(M/2−1−j), F2(j), F2(M/2−1−j) appearing on the right side of the operation equation become F1(j1), F1(M/2−1−$j_1$), F2($j_1$), F2(M/2−1−$j_1$), respectively. When j is $j_2$=M/2−1−$j_1$, they become F1(M/2−1−$j_1$), F1($j_1$), F2(M/2−1−$j_1$), F2($j_1$), respectively. Specifically, F1($j_1$)=F1(M/2−1−$j_2$), F2($j_1$)=F2(M/2−1−$j_2$). Therefore, the following results:

$$G(j_1)=a0 \cdot F1(j_1)+a1 \cdot F1(M/2-1-j_1)$$
$$+a2 \cdot F2(j_1)+a3 \cdot F2(M/2-1-j_1)$$
$$G(j_2)=a0 \cdot F1(M/2-1-j_1)+a1 \cdot F1(j_1)$$
$$+a2 \cdot F2(M/2-1-j_1)+a3 \cdot F2(j1)$$
$$G(M-1-j_1)=a4 \cdot F1(j_1)+a5 \cdot F1(M/2-1-j_1)$$
$$+a6 \cdot F2(j_1)+a7 \cdot F2(M/2-1-j_1)$$
$$G(M-1-j_2)=a4 \cdot F1(M/2-1-j_1)+a5 \cdot F1(j_1)$$
$$+a6 \cdot F2(M/2-1-j_1)+a7 \cdot F2(j_1)$$

The arithmetic operations of four functional values G regarding j, i.e., $j_1$, j2, M−1−$j_1$, M−1−$j_2$ are the same in the set of functional values F1(j), F1(M/2−1−j), F2(j), F2(M/2−1−j). According to the present invention, if the functional values F1($j_1$), F1(M/2−1−$j_1$), F2($j_1$), F2(M/2−1−$j_1$) regarding j=$j_1$ are read in four registers, these are used in common in the calculations of functional values G($j_1$), G($j_2$), G(M−1−$j_1$), G(M−1−$j_2$), i.e., G($j_1$), G(M/2−1−$j_1$), G(M−1−$j_1$), G(M/2+$j_1$). In other words, once the set of functional values F1, F2 is read from the memory to the register, it is continuously held and fails to be overwritten with other data during the calculation of the four G values. Therefore, for example, if the set of functional values F1, F2 for calculating the functional value G($j_1$) is read from the memory to the register, the functional values G(M/2−1−$j_1$), G(M−1−$j_1$), G(M/2+$j_1$) can be calculated without newly reading the set of functional values F1, F2 from the memory.

DESCRIPTION OF THE PREFERRED EMBODIMENT

The embodiment of the present invention will next be described with reference to the drawings.

Figure 3:
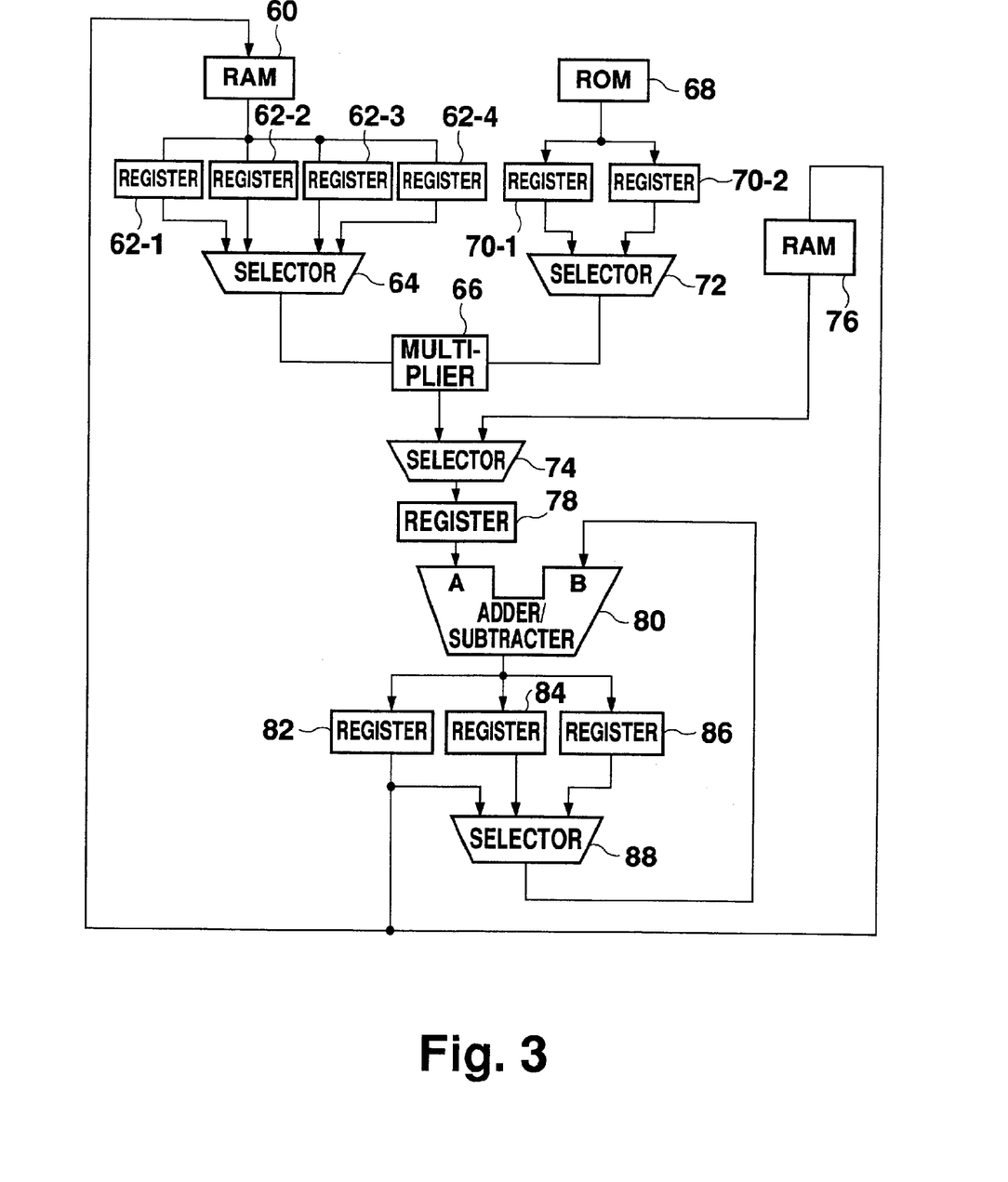
FIG. 3 is a block diagram showing IMDCT circuit of the present invention in an MD system which is a voice recording/reproducing device using MDCT.

FIG. 3 is a block diagram of an IMDCT circuit in which the present invention is applied in an MD system or voice recording/reproducing device using MDCT. The voice recording/reproducing device of the embodiment includes a voice data encoding/decoding section having the same block structure as shown in FIG. 1. The circuit is used in the decoding process for reproducing voice from the digital data recorded in MD in the same manner as IDCT circuit 12 of FIG. 1. The frequency component data X(k) for each of high, medium and low frequency bandwidths transmitted from the inverse quantizing unit 10 are IMDCT-processed to generate the time series voice data y(n) for each of the three frequency bandwidths and transmit the data to IQMF circuit 14.

Since the basic arithmetic operation algorithm of IMDCT performed by the circuit is the same as the related-art algorithm described above, the description is simplified by referring to the related art.

The data before conversion or frequency component data X(k) is stored in RAM 60. The RAM 60 can also store the interim results of the arithmetic operation. Four registers 62-1 to 62-4 are arranged in parallel with the output of RAM 60, in which the data read from RAM 60 can be held. A selector 64 selects any one of the registers 62-1 to 62-4, and transmits the content of the selected register to a multiplier 66.

The proportional coefficient by which the data read from RAM 60 is multiplied, e.g., $a_L$ (L=0 to 3) is stored in ROM 68. Two registers 70-1, 70-2 are arranged in parallel with the output of ROM 68, in which the coefficients read from ROM 68 can be held. A selector 72 selects either one of two connected registers 70-1, 70-2 in the same manner as the selector 64 to output the content of the selected register. The selector 72 is also provided with value "1" as an output to be selected in addition to the contents held in the registers. Specifically, the selector 72 selects any one of the contents held in the registers 70-1, 70-2 and the value "1" under external control to transmit the selected output to a multiplier 66. The meaning of the value "1" will be described later.

The multiplier 66 receives and multiplies the value transmitted from the selector 64 on the side of RAM 60 and the value transmitted from the selector 72 on the side of ROM 68 to output the multiplied value.

A selector 74 selects the multiplication result transmitted from the multiplier 66 or the value read from RAM 76 to store the selected value in a register 78.

An adder/subtracter 80 has two input terminals A, B to add/subtract values transmitted to the terminals. The output of the register 78 is connected to one input terminal, e.g., the input terminal A. The output side of the adder/subtracter 80 is connected to three registers 82, 84, 86. The other input terminal B of the adder/subtracter 80 is connected to the output of a selector 88, whose input side is connected to the registers 82, 84, 86.

The selector 88 has a general function of selecting any one of the three connected registers 82, 84, 86 to output the content of the selected register, and is also provided with value "0" as an output to be selected in addition to the contents held in the registers. Specifically, the selector 88 selects any one of the four outputs, i.e., the contents held in the registers 82, 84, 86 and the value "0", under the control from the outside to transmit the selected output to the input terminal B of the adder/subtracter 80. The meaning of the value "0" will be described later.

The output of the adder/subtracter 80 can be stored in RAM 60 and RAM 76 via the register 82. In the structure, for example, the data in the course of the arithmetic operation can be accumulated in RAM 60, or the voice data y(n) can be stored in RAM 76 when the voice data is obtained from the frequency component data X(k) for one block.

Additionally, in order to minimize the distortion of voice. at each boundary between the blocks, the range of the block is determined in such a manner that the end of the preceding block and the top of the following block are overlapped with each other. In the overlapped area, the data values of these blocks are added to generate the final voice data y(n). To overlap the data, the voice data stored in RAM 76 needs to be returned to the adder/subtracter 80. To realize such a structure in the circuit, the selector 74 is placed between the multiplier 66 and the adder/subtracter 80, and connected to the output of RAM 76.

The selector 72 is constituted to output the value "1". In the structure, the input system to the adder/subtracter is unified for both the cases where the data read from RAM 60 and multiplied by the proportional coefficient is transmitted to the adder/subtracter 80 and where the value of the data is transmitted to the adder/subtracter 80 as it is without multiplying the data by the proportional coefficient, and the selector which has been needed for switching is eliminated to thus simplify the circuit structure. Specifically, the data read from RAM 60 is passed through the multiplier 66. On the other hand, when the value read from RAM 60 needs to be transmitted to the adder/subtracter 80 as it is, "1" is outputted from the selector 72. In this case, the output value of the multiplier 66 is made equal to its input value. Therefore, the need for the selector 36, which has been used in the conventional circuit, can be obviated.

The selector 88 is constituted to output "0". The reason for this structure is related to the structure in which the output of the multiplier 66 is transmitted only to one input terminal A of the adder/subtracter 80 and only the loopback from the output of the adder/subtracter 80 is connected to the other input terminal B. By the structure of the circuit in which no data is transmitted to the input terminal B from the multiplier 66, the selector, which has been necessary for the switching to the loopback from the output of the adder/subtracter 80, is disused to simplify the circuit structure. In the structure, in order to add/subtract the operand data transmitted to the input terminals of the adder/subtracter 80, the value transmitted to the input terminal A is passed by the adder/subtracter 80 and directed to the input terminal B. Specifically, in order to allow the value transmitted to the input terminal A to pass by, the value "0" is transmitted to the input terminal B of the adder/subtracter 80 from the selector 88. For example, the adder/subtracter 80 adds the data of the input terminal A and the data "0" of the input terminal B, and stores the added result to any one of the registers 82, 84, 86. Thereby, the operand data transmitted to the input terminal A is passed toward the output side of the adder/subtracter 80, and the value is returned to the input terminal B of the adder/subtracter 80 via the selector 88. The value can therefore be used in the adding/subtracting with the calculated data transmitted to the input terminal A.

It will next be described how the aforementioned IMDCT arithmetic operation be performed in the circuit. First, Z(j) is calculated from U(k) which is obtained by rearranging the data before conversion, i.e., frequency component data X(k) based on the equation (13). The operation is the same as the conventional operation in that the data U(k) is stored in RAM 60 and sin $\psi(j)$, cos $\psi(j)$ are stored in ROM 68. When the right side of the equation (13) regarding a certain j is calculated, U(2j) and U(2j+1) are read from RAM 60, and stored in any two of the registers 62-1 to 62-4, e.g., the registers 62-1 and 62-2. Moreover, cos $\psi(j)$ and sin $\psi(j)$ are read from ROM 68, and stored in the registers 70-1 and 70-2, respectively. Additionally, the real-number and imaginary-number portions of Z(j) are calculated successively using the multiplier 66 and the adder/subtracter 80.

For example, in the calculation of the real-number portion, U(2j+1) stored in the register 62-2 and sin $\psi(j)$ stored in the register 70-2 are multiplied in the multiplier 66 to obtain the second term on the right side of the equation (13) and transmit it to the input terminal A of the adder/subtracter 80. The value of the second term is passed through the adder/subtracter 80, and stored, for example, in the register 86. Subsequently, the first term on the right side of the equation (13) is obtained by multiplying U(2j) stored in the register 62-1 and cos $\psi(j)$ stored in the register 70-1 in the multiplier 66. The value of the first term is transmitted to the input terminal A of the adder/subtracter 80, while the value of the second term is transmitted to the input terminal B from the register 86, so that the adder/subtracter 80 performs subtraction "A–B". Then, the real-number portion of Z(j) is calculated. The output result is stored in RAM 60 via the register 82.

Additionally, the equation (13) is characterized in that the values for use in the calculation of the real-number portion are the same as the values for use in the calculation of the imaginary-number portion. Specifically, all the values necessary for the calculation of the imaginary-number portion, i.e., U(2j), U(2j+1) stored in RAM 60 and sin $\psi(j)$, cos $\psi(j)$ stored in ROM 68 are already read and held in the registers 62-1, 62-2, 70-1, 70-2 for the calculation of the real-number portion. Therefore, different from the conventional circuit, new data does not need to be read from RAM 60, ROM 68, which can reduce power consumption. The arithmetic operation of the imaginary-number portion using the values held in the registers is the same as that of the real-number portion, and the description thereof is omitted.

Subsequently, the arithmetic operation is performed using Z(k) to obtain z(n) defined in the equation (3). In the arithmetic operation, the arithmetic operations represented by the equation (4) are repeated. Additionally, the arithmetic operation of one equation (4) in the circuit is performed as follows. Through the arithmetic operation described above, Z(j) is stored in RAM 60, and phase factor exp(i$\psi'$(j)) is pre-stored in ROM 68. The values Z($j_1$) and Z($j_2$) are read from RAM 60, and stored, for example, in the registers 62-1, 62-2, respectively. On the other hand, exp(i$\psi'$(j)) is read from ROM 68, and stored in the register 70-1. The multiplication of the second term of the equation (4) is performed using the values of the registers 62-2, 70-1, and the result value is passed through the adder/subtracter 80 and supplied to the input terminal B of the adder/subtracter 80. on the other hand, the value of the first term stored in the register 62-1 is passed through the multiplier 66, and supplied to the input terminal A of the adder/subtracter 80. The adder/subtracter 80 performs the addition or the subtraction of these values, and completes the calculation of one equation (4), so that the value is stored in RAM 60. Additionally, in a sequence of calculation of equation (4) in FFT arithmetic operation, in order to form a pair with the following calculation:

$$Z(j_1)+Z(j_2)\cdot\exp(i\psi'(j)) \quad (4)$$

the following calculation is also performed:

$$z(j_1)+z(j_2)\cdot\exp\{i(\psi'(j)+\pi)\} \quad (4')$$

Simply by storing the phase factor $\exp\{i(\psi'(j)+\pi)\}$ in ROM 68, the calculation (4') can be performed when the procedure described above as the calculation of one equation (4) is repeated. However, if the following relationship is noted, $$\exp\{i(\psi'(j)+\pi)\}=-\exp(i\psi'(j)) \quad (14)$$

the following efficient processing can be realized in the circuit:

Specifically, after the calculation of the equation (4), the calculation of the equation (4') forming a pair with the equation (4) is performed using the values $Z(j_1)$, $Z(j_2)$ being held in the registers 62-1, 62-2 and the value $\exp(i\psi'(j))$ being held in the register 70-1. Thereby, the procedure for reading from RAM 60, ROM 68 is omitted, so that the current consumption can be suppressed. Additionally, the aforementioned calculation of z(n) is also a complex arithmetic operation. The real-number portion and the imaginary-number portion are also separately calculated in the circuit.

Subsequently, the arithmetic operation for obtaining u(n) defined in the equation (5) is performed using z(n). The value z(n) is stored in RAM 60 by the arithmetic operation described above. Additionally, the proportional coefficient $a_L$(L=0 to 3) is pre-stored in ROM 68. In the calculation of the equation (5) regarding $n=n_1$, $Rez(n_1)$, $Rez(M/2-1-n_1)$, $Imz(n_1)$, $Imz(M/2-1-n_1)$ are read from RAM 60, and stored, for example, in the registers 62-1, 62-2, 62-3, 62-4, respectively. On the other hand, $a_2$, $a_3$ corresponding to $n=n_1$ are read from ROM 68, and stored in the registers 70-1, 70-2, respectively. The multiplication of the fourth term on the right side of the first equation of the equation (5) is performed using the values of the registers 62-4, 70-2. The result value is passed through the adder/subtracter 80, and supplied to the input terminal B of the adder/subtracter 80. On the other hand, the third term of the right side is calculated in the multiplier 66 using the values of the registers 62-3, 70-1, and supplied to the input terminal A of the adder/subtracter 80. The adder/subtracter 80 adds these values, and stores the added value, for example, in the register 86 connected to the output of the adder/subtracter 80. Subsequently, $a_0$, $a_1$ are read corresponding to $n=n_1$ from ROM 68, and stored in the registers 70-1, 70-2, respectively. The multiplication of the second term of the right side is performed using the values of the registers 62-2, 70-2. The value of the multiplication result and the value held in the register 86 are transferred to the input terminals A, B of the adder/subtracter 80, respectively. The addition result from the adder/subtracter 80 is stored in the register 86. In the same manner, the value of the first term of the right side obtained using the values of the registers 62-1, 70-1 and the addition result of the second to fourth terms held in the register 86 are transferred to the input terminals A, B of the adder/subtracter 80, respectively, and added in the adder/subtracter 80. Thereby, the arithmetic operation of the first equation of the equation (5) is completed, and the arithmetic operation result is stored in RAM 60 via the register 82.

Additionally, in the equation (5), the first equation representing u(n) and the second equation representing u(M−1−n) are characterized in that calculation can be performed using a single set of Rez(n), Rez(M/2−1−n), Imz(n), Imz(M/2−1−n). Therefore, after $u(n_1)$ is calculated in the circuit, $u(M-1-n_1)$ is successively calculated. Thereby, $u(M-1-n_1)$ can be calculated while $Rez(n_1)$, $Rez(M/2-1-n_1)$, $Imz(n_1)$, $Imz(M/2-1-n_1)$ for use in the calculation of $u(n_1)$ are held in the registers 62-1 to 62-4. Specifically, the values $Rez(n_1)$, $Rez(M/2-1-n_1)$, $Imz(n_1)$, $Imz(M/2-1-n_1)$ necessary for the calculation of $u(M-1-n_1)$ do not need to be newly read from RAM 60, and the values stored in the registers 62-1 to 62-4 can be used. Thereby, the frequency of access to RAM 60 in the calculation of the equation (5) can be reduced to half that in the conventional art, so that the current consumption of the operation can be suppressed.

Moreover, Rez(n), Rez(M/2−1−n), Imz(n), Imz(M/2−1−n) appearing on the right side of the equation (5) correspond to $Rez(M/2-1-n_1)$, $Rez(n_1)$, $Imz(M/2-1-n_1)$, $Imz(n_1)$, respectively, when n corresponds to $n_2\equiv M/2-1-n_1$. When comparing these values with the values $Rez(n_1)$, $Rez(M/2-1-n_1)$, $Imz(n_1)$, $Imz(M/2-1-n_1)$ when n is $n_1$, it is found that $Rez(n_1)=Rez(M/2-1-n_2)$, $Im(n_1)=Im(M/2-1-n_2)$. Therefore, when the proportional coefficient for $n=n_2$ is represented by $a'_L$(L=0 to 3), the following results:

$$u(n_1)=a_0\cdot Rez(n_1)+a_1\cdot Rez(M/2-1-n_1)$$
$$+a_2\cdot Imz(n_1)+a_3\cdot Imz(M/2-1-n_1)$$
$$u(n_2)=a'_0\cdot Rez(M/2-1-n_1)+a'_1\cdot Rez(n_1)$$
$$+a'_2\cdot Imz(M/2-1-n_1)+a'_3\cdot Imz(n_1)$$
$$u(M-1-n_1)=a'_2\cdot Rez(n_1)-a'_3\cdot Rez(M/2-1-n_1)$$
$$-a_0\cdot Imz(n_1)+a_1\cdot Imz(M/2-1-n_1)$$
$$u(M-1-n_2)=a'_2\cdot Rez(M/2-1-n_1)-a'_3\cdot Rez(n_1)$$
$$-a'_0\cdot Imz(M/2-1-n_1)+a'_1\cdot Imz(n_1) \quad (15)$$

Specifically, the equation (5) has a characteristic that not only $u(M-1-n_1)$ but also $u(n_2)$, $u(M-1-n_2)$ can be calculated using the set of values Rez(n), Rez(M/2−1−n), Imz(n), Imz(M/2−1−n) for use in the calculation of $u(n_1)$. In the circuit the values $Rez(n_1)$, $Rez(M/2-1-n1)$, $Imz(n_1)$, $Imz(M/2-1-n_1)$ for use in the calculation of $u(n_1)$ can be held in the registers 62-1 to 62-4. Therefore, after $u(n_1)$ is calculated, $u(M-1-n_1)$, $u(n_2)$, $n(M-1-n_2)$ are successively calculated. In this case, the operation of reading the values $Rez(n_1)$, $Rez(M/2-1-n_1)$, $Imz(n_1)$, $Imz(M/2-1-n_1)$ from RAM 60 for the calculation can be omitted. Thereby, the frequency of access to RAM 60 in the calculation of the equation (5) can be reduced to a quarter of that in the conventional art, so that the current consumption can be suppressed.

Additionally, in the circuit the output of ROM 68 is provided with two registers. However, since the first and second equations of the equation (5), the first and third equations of the equation (15), or the second and fourth equations of the equation (15) use the same set of the proportional coefficients $a_L$ (L=0 to 3), by arranging four registers on the output of ROM 68, the operation of reading the proportional coefficient from ROM 68 can be obviated.

The final digital time series voice data y(n) is obtained by rearranging and reconstructing the sequence u(n) obtained as described above. The IMDCT circuit transmits its transform result to IQMF circuit 14, thereby completing a sequence of processing.

The embodiment of the IMDCT arithmetic operation according to the present invention has been described. However, the present invention can also be used in an MDCT circuit. This is because MDCT and IMDCT arithmetic operations are performed using substantially the same equation formats. Specifically, the equations (8), (9), (11) in MDCT are the same in format as the equations (2), (3), (5) in IMDCT. Therefore, by connecting four registers to the output of RAM in which the calculated data is stored in the MDCT circuit as well, the process of reading the data from RAM is eliminated to enhance the processing efficiency as described above in the above equations (2), (3), (5) of IMDCT, so that the current consumption can be suppressed.

According to the discrete cosine transform circuit and its operation method of the present invention, the output of the memory for storing the calculated data is provided with four registers. The circuit is operated in such a manner that the arithmetic operations in which the calculated data temporarily read into the registers can be used in common are performed in a batch. Thereby, the processing efficiency is enhanced to reduce the frequency of access to RAM or another memory for storing the operand data. Especially, the current consumed in the operation can advantageously be suppressed. Another effect is obtained that the access time is shortened.

What is claimed is:

1. A discrete cosine transform circuit provided with a multiplier and an adder/subtracter and performing discrete cosine transform represented by the following relational equation between 2M items of time series voice data y(n) represented by a time index of continuous integer n and M items of frequency component data X(k) represented by a wave number index of continuous integer k:

$$y(n) = \sum_{K=0}^{M-1} X(k)\cos\left(\frac{\pi(2k+1)(2n+M+1)}{4M}\right) (0 \leq n < 2M)$$

said discrete cosine transform circuit comprising:
- an operand data memory for storing operand data based on either data before conversion of said time series voice data y(n) or said frequency component data X(k);
- four operand data registers able to hold the operand data read from said calculated data memory; and
- an operand data selector for selecting any one of said four operand data registers to transmit the value held by the selected register to said multiplier.

2. The discrete cosine transform circuit according to claim 1, comprising:
- a proportional coefficient memory for storing a proportional coefficient by which said operand data is multiplied in said multiplier;
- two proportional coefficient registers able to hold the proportional coefficient read from said proportional coefficient memory; and
- a proportional coefficient selector for selecting either one of said two proportional coefficient registers to transmit the value held in the proportional coefficient register to said multiplier.

3. A discrete cosine transform circuit provided with a multiplier and an adder/subtracter, performing discrete cosine transform represented by the following relational equation between 2M items of time series voice data y(n) represented by a time index of continuous integer n and M items of frequency component data X(k) represented by a wave number index of continuous integer k:

$$y(n) = \sum_{K=0}^{M-1} X(k)\cos\left(\frac{\pi(2k+1)(2n+M+1)}{4M}\right) (0 \leq n < 2M)$$

and performing transform processing including arithmetic operation for obtaining functional values G(j) and G(M−1−j) from two functional values F1(j) and F2(j) (argument j being an integer, and $0 \leq j < M/2$) obtained based on said time series voice data y(n) or said frequency component data X(k) by following operation equation:

G(j)=a0•F1(j)+a1•F1(M/2−1−j)

+a2•F2(j)+a3•F2(M/2−1−j)

G(M−1−j)=a4•F1(j)+a5•F1(M/2−1−j)

+a6•F2(j)+a7•F2(M/2−1−j), (a0 to a7 being proportional coefficients),
said discrete cosine transform circuit comprising:
- an operand data memory for storing said functional values F1(j) and F2(j);
- four operand data registers able to hold the value read from said operand data memory; and
- an operand data selector for selecting any one of said four operand data registers to transmit the value held by the selected register to said multiplier.

4. A method for operating the discrete cosine transform circuit according to claim 3, comprising the steps of:
- reading a set of said functional values F1(j), F1(M/2−1−j), F2(j), F2(M/2−1−j) corresponding to a certain j from the operand data memory to store the values in said four operand data registers;
- holding the stored set of said functional values in said operand data registers while both the first and second equations of said operation equation are calculated corresponding to the value of j; and
- calculating both the first and second equations of said operation equation corresponding to the value of j using the held set of said functional values.

5. A method for operating the discrete cosine transform circuit according to claim 3, comprising the steps of:
- reading a set of said functional values F1(j), F1(M/2−1−j), F2(j), F2(M/2−1−j) corresponding to a certain j from said operand data memory to store the values in said four operand data registers;
- holding the stored set of said functional values in said operand data registers while values of G(j), G(M−1−j), G(M/2−1−j) and G(M/2+j) in the value of j are calculated based on said operation equation; and calculating the values of G(j), G(M−1−j), G(M/2−1−j) and G(M/2+j) in the value of j using the held set of said functional values.

6. The discrete cosine transform circuit according to claim 1, comprising:

a proportional coefficient memory for storing a proportional coefficient by which said operand data is multiplied in said multiplier;

four proportional coefficient registers able to hold the proportional coefficient read from said proportional coefficient memory; and a proportional coefficient selector for selecting any one of said four proportional coefficient registers to transmit the value held in the proportional coefficient register to said multiplier.

7. The discrete cosine transform circuit according to claim 2, comprising:

a proportional coefficient memory for storing a proportional coefficient by which said operand data is multiplied in said multiplier;

four proportional coefficient registers able to hold the proportional coefficient read from said proportional coefficient memory; and a proportional coefficient selector for selecting any one of said four proportional coefficient registers to transmit the value held in the proportional coefficient register to said multiplier.

8. A method of operating the discrete cosine transform circuit according to claim 7, comprising the steps of, when a set of proportional coefficients (a0, a1, a2, a3) on the right side of said first operation equation and a set of proportional coefficients (a4, a5, a6, a7) on the right side of said second operation equation are constituted of the same elements:

reading a set of said functional values F1(j), F1(M/2−1−j), F2(j), F2(M/2−1−j) corresponding to a certain j from said operand data memory to store the values in said four operand data registers;

reading either one of the sets of said proportional coefficients (a0, a1, a2, a3) and (a4, a5, a6, a7) corresponding to j from said proportional coefficient memory to store the values in said four proportional coefficient registers;

holding the stored sets of said functional values and said proportional coefficients in said operand data registers and said proportional coefficient registers while both the first equation and the second equation of said operation equation corresponding to the value of j are calculated; and using the held sets of said functional values and said proportional coefficients to calculate both the first equation and the second equation of said operation equation corresponding to the value of j.

9. A method of operating the discrete cosine transform circuit according to claim 7, comprising the steps of, when a set of proportional coefficients on the right side of said first operation equation G(j) and a set of proportional coefficients on the right side of said second operation equation G(M−1−j) are constituted of the same elements:

reading a set of said functional values F1(j), F1(M/2−1−j), F2(j), F2(M/2−1−j) corresponding to a certain j from said operand data memory to store the values in said four operand data registers;

reading the set of said proportional coefficients on the right side of said operation equation G(j) or G(M−1−j) from said proportional coefficient memory to store the values in said four proportional coefficient registers;

holding the stored sets of said functional values in said registers while the values of G(j), G(M−1−j), G(M/2−1−j) and G(M/2+j) in the value of j are calculated based on said operation equation;

using the set of said functional values held in said operand data registers and the set of said proportional coefficients held in said proportional coefficient registers to continuously calculate said operation equations G(j) and G(M−1−j);

reading the set of said proportional coefficients on the right side of the operation equation G(M/2−1−j) or G(M/2+j) from said proportional coefficient memory to store the values in said four proportional coefficient registers; and using the set of said functional values held in said operand data registers and the set of said proportional coefficients held in said proportional coefficient registers to continuously calculate said operation equations G(M/2−1−j) and G(M/2+j).

* * * * *

UNITED STATES PATENT AND TRADEMARK OFFICE
CERTIFICATE OF CORRECTION

PATENT NO. : 6,308,194 B1
DATED : October 23, 2001
INVENTOR(S) : Matsui et al.

It is certified that error appears in the above-identified patent and that said Letters Patent is hereby corrected as shown below:

Title page,
Item [75], Inventors, after "Masato Fuma," delete "Ichinomiya" and insert therefor -- Aichi --

Column 2,
Line 31, after "Additionally" delete "ao" and insert therefor -- $a_0$ --

Column 4,
Line 61, after "hand" delete "ao" and insert therefor -- $a_0$ --

Column 5,
Line 45, after "samples is" delete ";"

Column 6,
Line 24, after "and" delete "$0 \leqq j < M/2$" and insert therefor -- $0 \leq j < M/2$ --

Column 11,
Line 2, after "substractor 80." delete "on" and insert therefor -- On --

Column 12,
Line 5, delete "$u(M-1-n_1) = a'_2 \cdot Rez(n_1) - a'_3 \cdot Rez(M/2-1-n_1)$" and insert therefor -- $u(M-1-n_1) = a_2 \cdot Rez(n_1) - a_3 \cdot Rez(M/2-1-n_1)$ --

Column 14,
Line 27, after "and" delete "$0 \leqq j < M/2$" and insert therefor -- $0 \leq j < M/2$ --

Signed and Sealed this

Nineteenth Day of July, 2005

JON W. DUDAS
*Director of the United States Patent and Trademark Office*